Jan. 5, 1932.  E. J. O'FLAHERTY  1,839,252
TOOL CHUCK
Filed Jan. 12, 1929  2 Sheets-Sheet 1
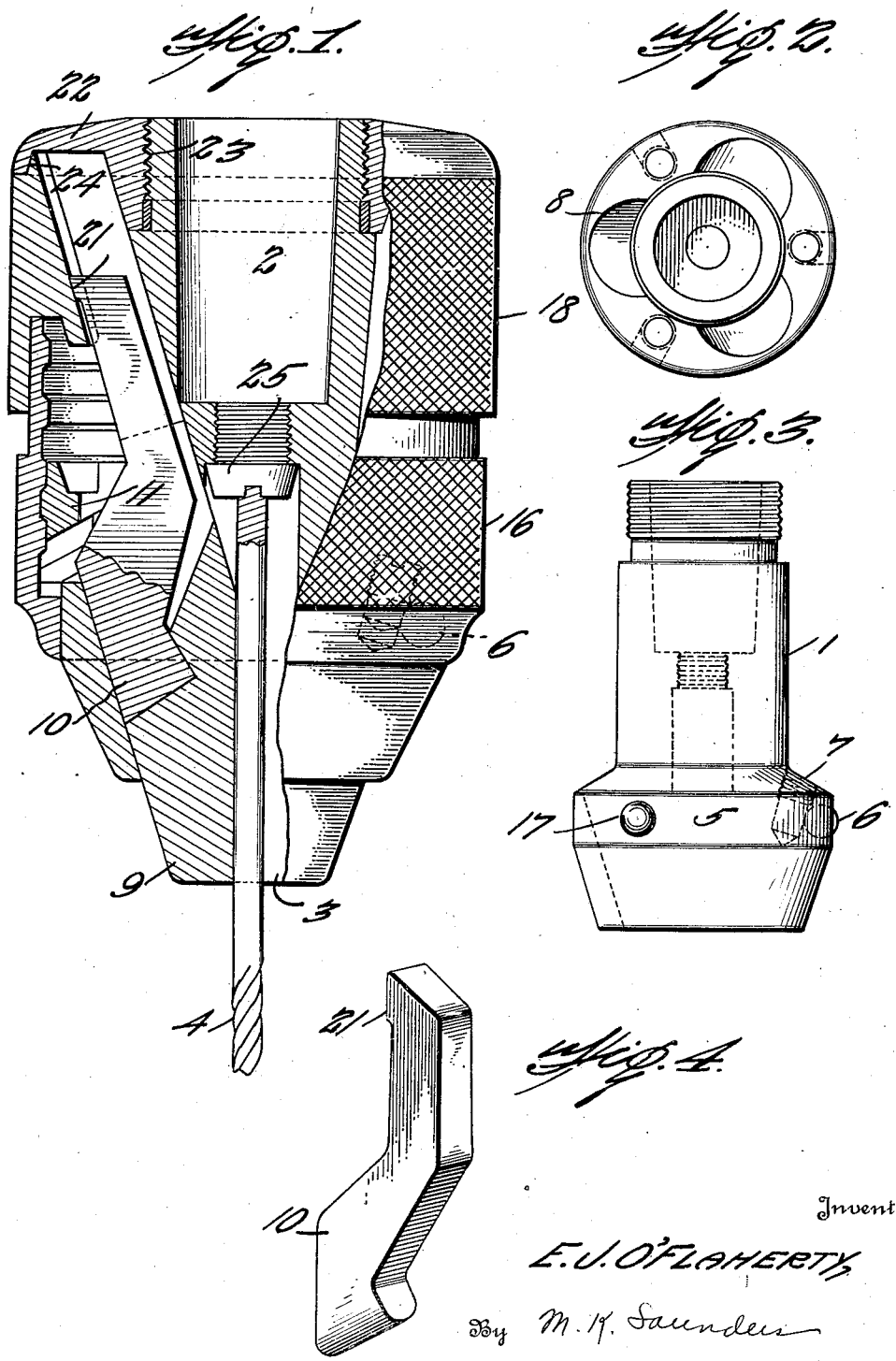
Inventor
E. J. O'FLAHERTY,
By M. K. Saunders
Attorney Jan. 5, 1932. E. J. O'FLAHERTY 1,839,252
TOOL CHUCK
Filed Jan. 12, 1929 2 Sheets-Sheet 2

Inventor
E. J. O'FLAHERTY,
By M. K. Saunders
Attorney

Patented Jan. 5, 1932

1,839,252

UNITED STATES PATENT OFFICE

EDWARD J. O'FLAHERTY, OF OIL CITY, PENNSYLVANIA

TOOL CHUCK

Application filed January 12, 1929. Serial No. 332,181.

This invention relates to a chuck or socket for drills, bits and the like such as is disclosed in my prior Patent No. 1,694,558, dated December 11, 1928, and the object of my invention is to provide a tool chuck which is simple in construction and effective in operation.

Another object of my invention is to provide a tool chuck in which the tool may be quickly inserted and firmly clamped and in which there is a minimum of moving parts.

I accomplish the above and other objects of my invention, which will be apparent as the description proceeds, by means of the construction shown in the accompanying drawings in which Fig. 1 is an elevation, partly in section of my tool chuck having a tool clamped therein;

Fig. 2 is a top plan of the body member of the chuck;

Fig. 3 is an elevation of the body member shown in Fig. 2;

Fig. 4 is a perspective of one of the locking dogs for the jaw members;

Figure 5:
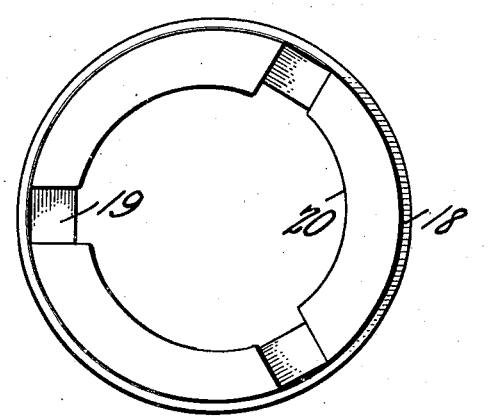
Fig. 5 is a plan of the cam ring.
Figure 7:
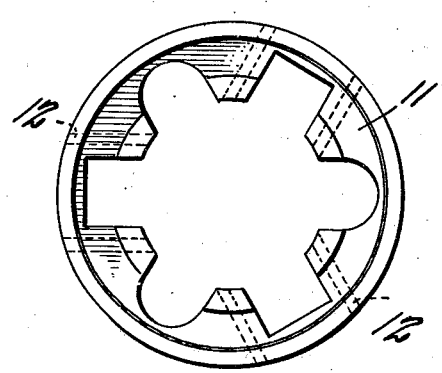
Fig. 7 is a plan of the jaw carrier.
Figure 6:
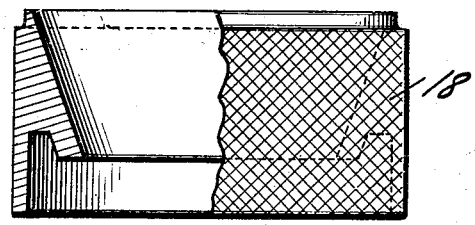
Fig. 6 is a vertical section of the cam ring shown in Fig. 5.
Figure 8:
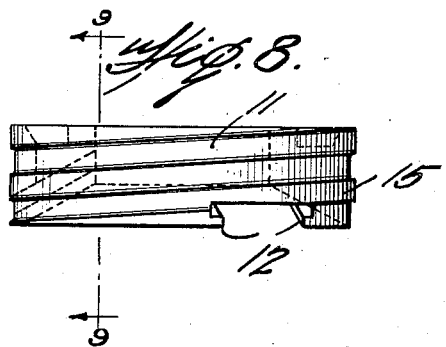
Fig. 8 is an elevation of the jaw carrier.
Figure 9:
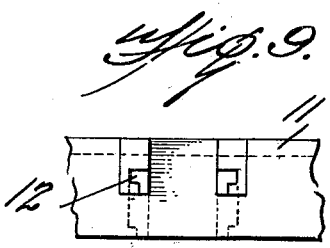
Fig. 9 is a fragmentary view looking in the direction of the arrows 9—9 of Fig 8.
Figure 10:
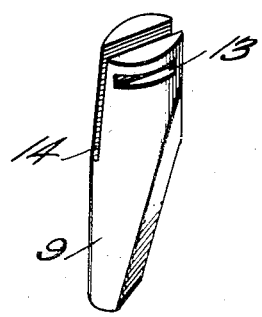
Fig. 10 is a perspective of one of the jaw members.

On the drawings, in which like reference characters indicate like parts on all the views thereof, 1 indicates the main body having a longitudinal recess 2 in the upper part thereof for the reception of a shank or handle and a recess 3 in the lower part for the reception of the tool 4. The body member 1 has an enlarged lower portion 5; in suitable recesses adjacent the junction of the lower and upper portion are positioned ball bearings 6 held in place by means of heavy grease and screws 7.

Extending through the body member 1 and terminating in the lower recess 3 are three oblique openings 8 for the reception of the jaws 9 and clamping dogs 10. The jaws are loosely mounted in openings in a jaw carrier 11 and are attached thereto by the engagement of the inwardly extending lugs 12 of the jaw carrier, in the recesses 13 formed in the upper periphery of each jaw.

The jaws 9 are each provided with a longitudinal slot 14 forming a bifurcation in which is loosely mounted a clamping dog 10. The bifurcation is formed with a sloping wall of peculiar formation as is clearly shown in Figure 1. Each clamping dog 10 is provided with a rear face substantially conforming to the sloping wall of the jaw bifurcation in which it is seated.

The outer periphery of the jaw carrier is formed with an external quick acting helical groove 15.

A jaw carrier operating ring 16 is formed with an internal left hand helical groove adapted to cooperate with the similarly formed external groove 15 on the jaw carrier to advance and retract the carrier, thus extending and retracting the jaws 9. The lower inner periphery of the jaw carrier operating ring is adapted to engage the face 17 of the body member 1 and will be held in position by the balls 6 which are forced outwardly against the same by the screws 7.

A cam ring 18 cooperates with the clamping dogs 10 for moving the jaws to their clamping position. The ring 18 has a tapered inner wall in which are formed three recesses 19 which serve to position the upper ends of the dogs when the parts of the chuck are assembled. Cam faces 20 are formed on the tapered wall of the cam ring 18 in such manner that each cam face merges into and forms a substantial continuation of one of the recesses 19. The dogs are each formed with an extension 21 at the upper end thereof, which extension is adapted to ride on one of the cam faces. Thus, when the cam ring is turned to cause the extensions 21 to ride on the cam faces, the upper ends of the dogs will be forced inwardly towards the center of the chuck; this movement of the upper ends of the dogs tends to pivot the dogs in the jaw bifurcations and force them outwardly at their lower ends. The lower ends of the dogs are prevented from moving outwardly of the bifurcation by the walls of the oblique openings 8 in the main body member 1 as is shown in section in the lower left hand portion of Figure 1. Since the dogs cannot move outwardly, the force exerted against them causes them to act on the clamping jaws through their similarly formed contacting faces and the jaws are thus forced against the tool 4.

In order to hold the cam ring in position, a cover member 22 is provided which is formed with screw threads 23 cooperating with screw threads on the body member. The cover member 22 is formed with an inner five degree beveled face 24 which engages with a similar face on the cam ring serving as a friction hold therefor during the operation of the jaw carrier. This friction hold is not sufficient to prevent the rotation of the ring to operate the clamping dogs. A screw 25 is provided in the body member between the upper recess 2 and the lower recess 3. Should the shank or handle stick, the removal of this screw provides an opening into which a small punch may be inserted for forcing out the shank.

It is believed that the function and operation of my improved tool chuck is obvious from the foregoing description and that it is therefore only necessary to embody herein a short résumé thereof.

In manipulating the chuck to insert the tool in place, the jaw carrier ring is first rotated to the right whereby the jaw carrier and the jaws will be quickly retracted through the interengagement of the quick acting helical grooves. The tool is then inserted in the recess 3 with the jaws, surrounding the same. The operation of the jaw carrier is then reversed by turning the same to the left to advance the jaws. The cam ring is then rotated so that the upper external faces of the clamping dogs ride on the internal cam faces of the ring, the lower faces of the dogs bearing against the jaws and forcing them toward the centre of the body member thus clamping the tool in position.

Having thus described my invention, what I claim as new and desire to secure by Letters Patent is:—

1. In a chuck, a body member provided with a plurality of oblique sockets, a plurality of jaws slidable in said sockets and having faces cooperating with the walls of said sockets, means for sliding said jaws in the sockets, said means comprising a longitudinally movable jaw carrier, clamping dogs carried by said jaws and a cam ring relatively movable with relation to said jaw carrier and said body member and cooperating with said dogs to clamp said jaws in extended position.

2. In a chuck, a body member provided with a plurality of oblique sockets, jaws in said sockets, means for slidably extending the jaws in the sockets, and means for clamping the jaws in their extended position, said last named means comprising clamping dogs carried by said jaws and a cam ring rotatably mounted on said body member and cooperating with said dogs to clamp the jaws in extended position.

3. In a chuck, a body member provided with a plurality of oblique sockets, jaws in said sockets, means for slidably extending the jaws in said sockets, said means comprising a jaw carrier rotatably mounted on said body member, quick acting means for moving said jaw carrier and said jaws to extended position, means for clamping said jaws in extended position comprising dogs carried by said jaws and a cam ring rotatably mounted on said body member and engaging said dogs, and means on said body member for temporarily holding said cam ring while said jaw carrier is moved to extended position.

4. In a chuck, a body member, extensible jaws in said body member, a jaw carrier, means for detachably pivoting said jaws to said carrier, said means comprising inwardly extending lugs on said jaw carrier, said jaws being provided with recesses on their outer faces cooperating with said lugs for mounting said jaws on said jaw carrier, and means for extending said jaws.

5. In a chuck, a body member, extensible jaws in said body, a jaw carrier for said jaws, means for extending said jaws, dogs for clamping said jaws in extended position, each of said jaws being provided with a longitudinal bifurcation in which a dog is loosely positioned to slide and pivot relatively to said jaws.

6. In a chuck, a body member provided with a plurality of oblique sockets, a longitudinally movable jaw carrier, a plurality of jaws pivoted to said jaw carrier and slidably mounted in said socket, clamping dogs carried by said jaws, means for moving said jaw carrier longitudinally, said means comprising a ring surrounding said jaw carrier, said body member having an enlarged lower end, friction locking means on the outer face of said enlarged lower portion adapted to be engaged by the inner face of said jaw carrier operating ring.

In testimony whereof I hereunto affix my signature.

EDWARD J. O'FLAHERTY.